Dec. 8, 1964  M. S. LIPKINS  3,159,952
SPHERICAL CUTTING APPARATUS
Original Filed Feb. 26, 1960
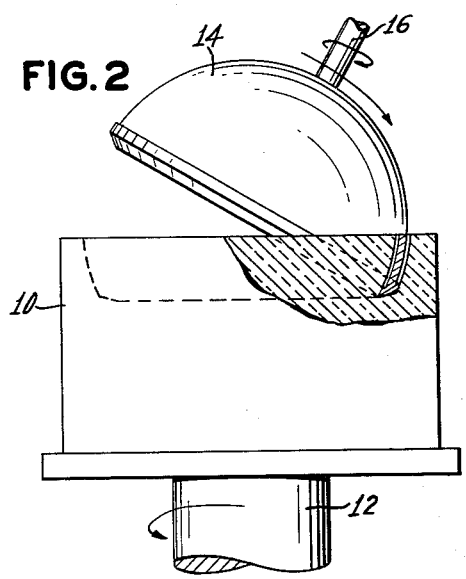
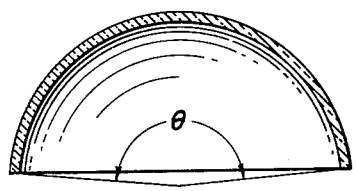
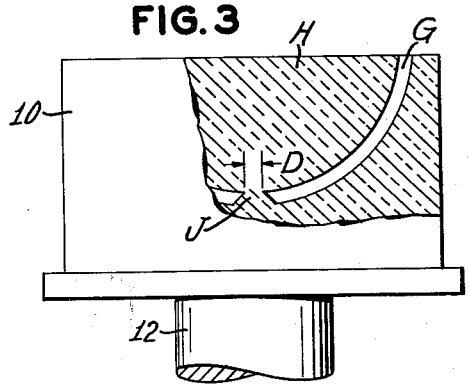
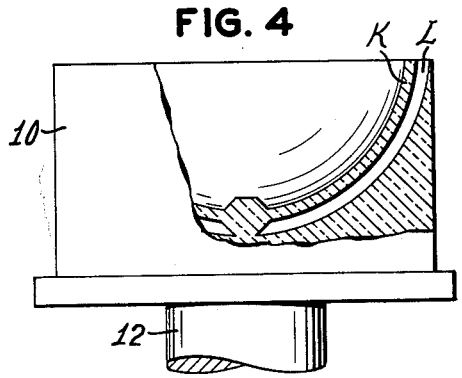
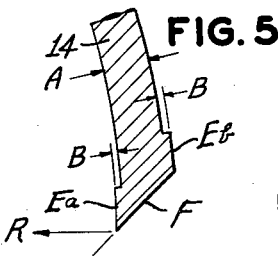
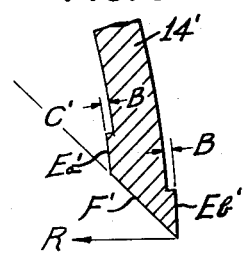
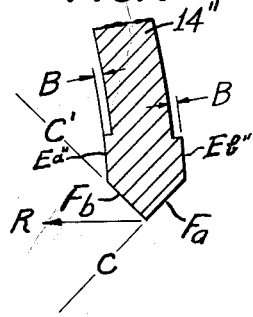
INVENTOR.
MORTON S. LIPKINS
BY
ATTORNEY United States Patent Office 3,159,952
Patented Dec. 8, 1964

3,159,952
SPHERICAL CUTTING APPARATUS
Morton S. Lipkins, 3 Nemeth St., Malverne, N.Y.
Original application Feb. 26, 1960, Ser. No. 11,256, now Patent No. 3,088,254, dated May 7, 1963. Divided and this application Sept. 17, 1962, Ser. No. 224,191
7 Claims. (Cl. 51—206)

The present invention relates to apparatus for making spherical shapes of hard, frangible materials. This is a division of my copending application Serial No. 11,256 filed Feb. 26, 1960, now Patent No. 3,088,254, issued May 7, 1963.

In my copending application, Serial No. 795,212, filed Feb. 24, 1959, now Patent No. 3,088,253, issued May 7, 1963, it is shown that great economy of both time and material can be realized through application of a spherical cutter to this purpose. The material involved may be quite expensive and the waste pieces may have high salvage value whereas, if the whole shape were formed by abrading techniques, the waste would be of much lower value, if any. Examples of such materials are synthetic sapphire and single-crystal silicon. Even where salvage of waste pieces may not be of controlling concern, it will be appreciated that use of a spherical cutter can avoid waste of much time and effort involved in abrading away large volumes of starting material to produce a spherical shape, such as a hollow dome.

A particular problem is involved in the making of spherical cuts in hard and brittle materials, which is solved in one manner in my previous application, mentioned above. The spherical cut is there made by supporting a spherical cutter for rotation about its axis, and the workpiece is arranged for slow rotational drive about an axis perpendicular to the exposed face of the workpiece, the two axes intersecting at the spherical center of the cutting tool. The cutter is not only rotated about its own axis, but the angle between the cutter axis and he rotational axis of the work is progressively changed as the cutter penetrates into the work. Ultimately, a connecting neck of material remains which provides support for the convex-surfaced portion of the material. When the cut has progressed to the point that the supporting neck can no longer be relied on for sufficient strength, additional support is provided for the portion of material that is carried by this neck. When this is done, the cut-off operation may be completed. Supplementary support for the inner convex portion is provided, according to my previous application, by using cement between the inner and outer walls of the cut or at any other suitable position. Thereafter, rotation of the work being interrupted, rotation of the cutting tool continues with progressive penetration, until the cut-off is complete.

The foregoing method is useful for both hypospherical and hyper-spherical shapes to be cut. There is the limitation that the saw cannot penetrate into the work to the full extent of half the plane angle of the saw because the supporting shaft of the saw approaches the surface of the work and saw penetration is thus restricted. The cut-off process there disclosed includes penetration of the edge of the saw to reach and cross the axis of rotation of the work, and only then can the supporting shaft of the saw reach the surface of the workpiece. Consequently, the angle of penetration of the saw in that method is substantially less than the plane angle of the saw. The angle of penetration is less than that of the saw by an amount determined by the radius of the supporting shaft of the cutter and by the diameter of the connecting neck of material that must be cut away after rotation of the workpiece has been interrupted.

An object of the invention resides in the provision of novel cutters useful in making spherical cuts in hard and frangible materials.

Additional objects of the invention relate to the provision of novel related cutters for making hollow domes of hard and brittle or frangible materials.

In carrying out the invention, as will be seen from the detailed illustrative description of the invention below, a hollow dome of hard and brittle material is formed by making two successive spherical cuts having a common spherical center using diamond-bearing cutters of the required spherical radii. The cutting operations involve rotation of a workpiece about its axis, and rotation of a spherical cutter about an axis intersecting with that of the work, the angular relationship between the two axes gradually being changed as the cutter penetrates into the work. When the penetration has proceeded to a critical point at which there is danger that the convex workpiece within the spherical cut may break off, the cutting operation is interrupted. The solid angle required of the cutter need not be any greater than this penetration plus allowance for the supporting shaft of the cutter. At the time that the cutting operation is interrupted, the supporting shaft of the spherical cutter may be at or very close to the surface of the work.

The spherical cutter is removed from the cut, and the convex portion of the cut or piece is broken away from the concave portion. Thereafter, whether the spherical surface desired is on the convex workpiece or on the concave workpiece, the fractured area is finished by any conventional spherical grinding operation.

It is important for the break to be a controlled one. According to a further feature of the invention, as is disclosed below, the advancing cutting edge of the spherical cutter is formed to produce a constriction in the connecting neck that is spaced from the desired spherical surface. The disclosed cutters have edges of conical form, the elements of such cone being disposed at a substantial angle relative to the radius to the spherical center. As a result, when the cutter has proceeded to the maximum depth of penetration leaving only a minimum connecting neck of material, that neck will be conical in shape. By using a conical cutting edge that slopes in the right direction, the narrow end of the conical connecting neck may be made remote from the part that is to be saved. In making a hollow dome, two different conical-edged spherical cutters are used, such that the connecting neck between the dome and each portion cut away from the dome has its narrowest cross-section remote from the dome surface. In each instance, when the connecting neck is broken, the fracture occurs at or close to the narrowest cross-section of the neck, providing assurance that the fracture will not extend to the desired spherical surfaces of the dome. The residual conical projections at the inside and outside of the dome cut in the foregoing manner are removed by conventional lens-grinding techniques for completing the spherical surfaces in the regions of the broken-away conical supporting necks.

In the preferred embodiment of the invention discussed below in detail, the cutters which form the desired constriction in the diameter of the neck are used for the entire cutting operation. However, it is apparent that the cutting operation could be carried out in two phases, at first using any desired cutter and, when the cut is to be concluded, a different cutter may be used having an edge whose cross-sectional contour will produce the break-controlling constriction in the neck considered above. The cutters described below are preferred since they are effective for the entire operation, without interruption; but such cutters could be used in only the final constriction-forming phase if some other cutter is preferred for the first phase.

In the preferred embodiment detailed below, the cutters have diamond-bearing cutting faces. Where permissible, this may be replaced by a "mud" or slurry containing a grit such as carborundum that is fed to the cutting edge, and such substitution is within present contemplation.

The nature of the invention and further features of novelty will be better appreciated from the following description of an illustrative embodiment of the invention shown in the accompanying drawings. In those drawings:

FIGURE 1 is a cross-sectional view of a dome which is to be made;

FIGURE 2 is a diagrammatic view, partly in cross-section, of a cutting operation in progress, including the cutting tool, the work, and its support;

FIGURES 3 and 4 are fragmentary lateral views of the workpiece at the completion of the first cut and second cut, respectively;

FIGURES 5 and 6 are greatly enlarged cross-sectional views showing cutting edge details of two spherical cutters utilized in making the cuts of FIGS. 3 and 4, respectively; and FIGURE 7 is a similar view of a modified cutting edge.

Referring now to the drawings, there is shown a cylindrical workpiece 10 with its axis vertical and supported on a rotary carrier 12 for engagement by a spherical cutter 14 that is carried by shaft 16. The material 10 may be any of various hard and brittle materials, such as synthetic sapphire, single-crystal silicon, glass, quartz, silicon carbide and the like. By means of suitable supporting and drive structure such as that in my copending application mentioned above, the spherical cutter is rotated rapidly about its shaft 16 while its axis is swung from nearly vertical to nearly horizontal attitude. The swing of the axis proceeds slowly, as the cutter penetrates into the work. The support 12 rotates gradually, and as the cutter penetrates into the work, it forms a spherical cut of progressively increasing depth. The maximum penetration of the cutter into the work is limited by interference between shaft 16 and the surface of the work. The cutting operation is interrupted when the cutting edge has reached a point where, if the cutting were to proceed, there would be serious danger of the workpiece breaking off accidentally.

The angle of the cut may be readily measured in terms of the plane angle $\theta$ of a finished dome in FIG. 1, made by two successive cuts represented in FIGS. 3 and 4. The angle $\theta$, in accordance with the present invention, may be as much as or perhaps even larger than the corresponding plane angle of the spherical cutters used. This is because, even though the shaft 16 cannot swing any farther than is permitted by the top surface of the workpiece, nevertheless the diameter of the supporting neck left at the end of the cut-off operation compensates approximately for the shaft diameter. It is actually possible to make a true complete hemisphere using a hemispherical cutter, despite the interference between the supporting shaft 16 and the surface of the workpiece.

As seen in FIGS. 3 and 4, two cuts of different spherical radii are made using two different cutters in order to make the near-hemispherical dome of FIG. 1. After each cut has been carried as far as practicable, the remaining supporting neck is broken for separating the convex portion from the concave portion of that cut.

While it is preferred to make the inside cut first and the outside cut second, as illustrated in FIGS. 3 and 4, it is feasible to reverse this sequence. The illustrated sequence is preferred because in this way it is necessary to mount the workpiece only once, and assurance is had that the rotational axis is the same for both cuts.

As illustrated in FIG. 5, the enlarged cross-section of the cutting-edge detail of one of the cutters involves a cutting surface F which is conical in form, the geometric conical elements or lines C of the conical surface extending through the rotational axis of the tool and making a substantial angle with the radius R that extends to the spherical center of the cutter. The wall thickness A of the rim-supporting portion of the cutter is smaller than the maximum projected width of the cutting surface (projected along radius R) because an overhang B is provided both at the inside surface and at the outside surface of wall A. The conical cutting surface F has embedded diamond-cutting material, as is true too of the lateral faces E.

Cutter 14 is operated as represented in FIG. 2 for gradually forming a spherical cut G into the body of the material 10, leaving a convex portion H. The cutter of FIG. 5 is preferably used first. Because there is a prominent angle between the conical cutting face F relative to the outer lateral surface E, the conical connecting neck J which supports portion H has a broad base and has a minimum diameter D that is spaced from the desired concave spherical surface that is to become the inside of the dome in FIG. 1. The inner lateral surface E$a$ of the cutter in FIG. 1 intersects with the conical cutting face F to define an edge, the plane angle between the straight-line elements in surface E$a$ and the cutting face F departing substantially from a right angle, 45° for example. When the cut of FIG. 2 is complete (FIG. 3) the inside convex portion can be broken, with assurance that the fracture will be a controlled one. The remaining portion of the connecting neck is subsequently removed by usual spherical grinding techniques.

In FIG. 6 another cutter 14' is shown, having a conical face F' and lateral surfaces E$a$' and E$b$' having overhang clearances B from the supporting wall of the cutter. The conical element C' has a reverse slant compared to that of conical element C in FIG. 5. An edge is defined by the intersection of surface E$b$' and cutting face F', the included angle here, too, being 45° in an example. The obtuse angle at E$a$' and F' produces a broad-base neck joining dome K to body 10 (FIG. 4) with a constriction spaced from the convex surface of the dome by a safe minimum for safe fracturing when dome K is broken away. When this occurs, and when the remaining part of the neck is removed by spherical grinding, the continuous inside and outside spherical surfaces are complete.

The effective radius of cutter surface E$a$' (FIG. 6) is larger than the effective radius of outer surface E$b$ of cutter 14 (FIG. 5) by the wall thickness of the dome, due allowance being made for clearance between the cut surface and the lateral surface of the cutter.

The slanting cutting faces of the tools in FIGS. 5 and 6 have edges that project well in advance of the lateral surfaces E$b$' and E$a$', in the direction of cutter penetration into the work, so that a broad based supporting neck is formed, spaced from a constriction at which the controlled parting fracture starts. The different amounts of projection of the cutting face may best be measured transverse to an imaginary conical surface generated by a radius R from the center of the spherical cutter to a circle at the cutting rim. However, a doubly conical cutting face F$a$ and F$b$ can be used (FIG. 7) if preferred; and other variants may likewise be found useful for the purposes here involved. These and other modifications and varied application of the invention in its various aspects will be suggested by the foregoing to those skilled in the art. Accordingly, the invention should be broadly construed, consistent with its full spirit and scope.

What is claimed is:

1. A cutter for hard and frangible materials, including a spherical wall of nearly hemispherical extent, a drive shaft projecting from the convex side thereof, and an annular diamond-bearing cutting rim at the edge of said wall, said rim having inner and outer lateral surfaces whose radii are, respectively, less than and greater than the radii to the inner and outer surfaces of said spherical wall so as to form cutting-rim overhangs, said rim having a conical cutting face, the conical elements of which make a large angle with the radius of the spherical wall, one lateral face of said rim intersecting said conical face in a sharp edge.

2. A cutter for hard and frangible materials, including a spherical wall, a drive shaft projecting from the convex side of said wall, and an annular diamond-bearing cutting rim on said wall, said rim having inner and outer lateral surfaces and having a conical cutting surface intersecting with one of said lateral surfaces in an obtuse angle that differs substantially from a right angle, measured in the plane containing the rotational axis of said drive shaft, and having an edge-defining acute-angled intersection with the opposite lateral surface of said cutting rim.

3. A cutter for hard and frangible materials, including a relatively thin support portion that is internally and externally spherical and a diamond-bearing cutting rim on said support portion, said rim having lateral portions projecting radially outward and inward relative to said spherical support portion, said lateral portions each having a lateral surface facing, respectively, outward and inward, said rim further having a cutting face from one of said lateral surfaces to the other, said cutting face projecting substantially different amounts in the direction of cutter penetration at different radii, the relative amounts of projection being measured transverse to an imaginary conical surface formed by a radius from the center of the spherical support portion moving through a circle at said cutting face, and said cutting face having a minimum extent of projection at one of said lateral surfaces.

4. A cutter for hard and frangible materials, including a cutting rim and a spherical supporting portion for said rim at least as thin as said cutting rim, said cutting rim having a pair of diamond-bearing lateral surfaces and a diamond-bearing cutting face, said cutting face extending from one of said lateral faces to the other and projecting substantially farther in the direction of cutter penetration at one of said lateral surfaces than at the other of said lateral surfaces, the amounts of projection of said cutting face being measured transverse to an imaginary conical surface formed by a radius of the spherical supporting portion moving through a circle at the cutting face.

5. A cutter for hard and frangible materials, including a cutting rim and a spherical rim-supporting portion at least as thin as said cutting rim, said cutting rim having a pair of diamond-bearing lateral surfaces and a diamond-bearing cutting face, said cutting face extending from one of said lateral faces to the other and projecting substantially farther in the direction of cutter penetration at a circle between said lateral surfaces than at least at one of said lateral surfaces, the amounts of projection of said cutting face being measured transverse to an imaginary conical surface formed by a radius of the spherical supporting portion moving through a circle at the cutting face.

6. A cutter in accordance with claim 5 wherein said cutting face projects farther, at a circle between said lateral surfaces than at both said lateral surfaces.

7. A cutter in accordance with claim 5 wherein the extent of projection of said cutting face is a maximum at one of said lateral surfaces and a minimum at the other.

References Cited in the file of this patent

UNITED STATES PATENTS

| | | |
|---|---|---|
| 2,019,072 | Clemens | Oct. 29, 1935 |
| 2,361,492 | Pare | Oct. 31, 1944 |
| 2,605,796 | Waters | Aug. 2, 1952 |

FOREIGN PATENTS

| | | |
|---|---|---|
| 7,452 | Great Britain | June 18, 1885 |